United States Patent
AlAhmari et al.

(10) Patent No.: US 11,535,791 B2
(45) Date of Patent: Dec. 27, 2022

(54) SAND CONSOLIDATION BY ENZYME MEDIATED CALCIUM CARBONATE PRECIPITATION

(71) Applicant: SAUDI ARABIAN OIL COMPANY, Dhahran (SA)

(72) Inventors: Manar A. AlAhmari, Dhahran (SA); Abdulmohsen A. Al-Humam, Dammam (SA); Mohammed A. Bataweel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/200,031

(22) Filed: Mar. 12, 2021

(65) Prior Publication Data
US 2022/0290035 A1  Sep. 15, 2022

(51) Int. Cl.
*C09K 8/56* (2006.01)
*E21B 43/02* (2006.01)
(Continued)

(52) U.S. Cl.
CPC .......... *C09K 8/5758* (2013.01); *C09K 8/5045* (2013.01); *C09K 8/514* (2013.01); *C09K 8/572* (2013.01); *E21B 43/025* (2013.01)

(58) Field of Classification Search
CPC ... E21B 43/025; C09K 8/5751; C09K 8/5753; C09K 8/5755; C09K 8/5758;
(Continued)

(56) References Cited

U.S. PATENT DOCUMENTS 9,199,880 B2 * 12/2015 Dosier .................... C12P 1/04
2014/0116692 A1 * 5/2014 Kotlar ................. C09K 8/5086
166/305.1
(Continued)

FOREIGN PATENT DOCUMENTS

CN 106699026 B 12/2018
JP 2011006333 A * 1/2011
(Continued)

OTHER PUBLICATIONS

Campbell et al., Inhibition of Proteinase B and Stabilisation of Malate Dehydrogenase in Extracts of the Yeast *Saccharomyces cerevisiae* by Turkey Egg White Fraction II-T, J. Gen. Appl. Microbiol., 41, 449-453 (1995) (Year: 1995).*
(Continued)

*Primary Examiner* — Angela M DiTrani Leff
(74) *Attorney, Agent, or Firm* — Osha Bergman Watanabe & Burton LLP

(57) ABSTRACT

Methods for treating a formation may include introducing components of a treatment solution into a wellbore such that the treatment solution contacts the formation to be treated, where the treatment solution may include urea, urease, a calcium ion source, one or more polysaccharides, a casein protein, a protease, an ionic compound, and a sugar, where the formation may have an amount of sand production before treatment and may be in fluid contact with the wellbore, and where an amount of sand production after treatment may be less than the amount of sand production before treatment. Consolidated sand structure compositions may include previously unconsolidated sand interlinked by inter-particle cementitious bonds comprising deposited calcium carbonate crystals, where the consolidated sand has a structural strength and the consolidated sand structure is porous to permit fluid flow through the composition.

12 Claims, 4 Drawing Sheets

(51) Int. Cl.
  *C09K 8/575* (2006.01)
  *C09K 8/57* (2006.01)
  *C09K 8/504* (2006.01)
  *C09K 8/514* (2006.01)
(58) Field of Classification Search
  CPC .......... C09K 8/575; C09K 8/57; C09K 8/572;
    C09K 8/56; C09K 8/514; C09K 8/5086;
    C09K 8/5083; C09K 8/508; C09K 8/506;
    C09K 8/5045; C09K 8/504; C09K 8/50
  See application file for complete search history.

(56) References Cited

U.S. PATENT DOCUMENTS

| | | | |
|---|---|---|---|
| 2015/0122486 A1* | 5/2015 | Luke | C04B 28/02 |
| | | | 106/724 |
| 2015/0204176 A1* | 7/2015 | Cunningham | C09K 8/5045 |
| | | | 166/292 |
| 2017/0029689 A1* | 2/2017 | Wilson | C09K 8/467 |
| 2018/0119185 A1* | 5/2018 | Kavazanjian | C12P 3/00 |
| 2018/0200765 A1* | 7/2018 | Halden | E02D 31/002 |
| 2019/0256770 A1 | 8/2019 | He et al. | |
| 2019/0264091 A1* | 8/2019 | Vorderbruggen | C09K 8/582 |

FOREIGN PATENT DOCUMENTS

| | | | | |
|---|---|---|---|---|
| JP | 5599032 B2 | 10/2014 | | |
| WO | WO-2009008724 A1 * | 1/2009 | ............ | C09K 8/582 |
| WO | 2020055915 A1 | 3/2020 | | |
| WO | WO-2020176613 A1 * | 9/2020 | ............ | D01G 11/04 |

OTHER PUBLICATIONS

Krajewska Urease-aided calcium carbonate mineralization for engineering applications: A review, Journal of Advanced Research, 13 (2018) 59-67 (Year: 2018).*

Zhong, Derivatized Skim Milk Powder for Use as Functional Ingredients in Transparent Beverages, University of Tennessee, 2016, retrieved Mar. 31, 2022 from https://portal.nifa.usda.gov/web/crisprojectpages/1007965-derivatized-skim-milk-powder-for-use-as-functional-ingredients-in-transparent-beverages.html (Year: 2016).*

Translation of JP-2011006333-A (Year: 2011).*

Almajed et. al.; "Enzyme Induced Biocementated Sand with High Strength at Low Carbonate Content", Scientific Reports, vol. 9, Issue 1, Feb. 4, 2019, pp. 1-7 (7 pages).

Bansal et al.; "Journey of a Technology from Lab to Readiness for Field Application: Enzymatic CaC03—A Novel, Enviroment-friendly System for Conformance and Sand Consolidation", SPE-171958-MS, Society of Petroleum Engineers Inc., Nov. 2014 (19 pages).

Nasser M. Hamdan, "Applications of Enzyme Induced Carbonate Precipitation (EICP) for Soil", Arizona State University, May 2015 (243 pages).

Abdullah A Almajed, "Enzyme Induced Carbonate Precipitation (EICP) for Soil Improvement", Arizona State University, Aug. 2017 (149 pages).

Arab et al.; "EICP Cemented Sand Modified with Biopolymer", In: Recent Research in Sustainable Structures GeoMEast 2019. Sustainable Civil Infrastructures. Springer, Nov. 1, 2019, pp. 74-85 (12 pages).

Almajed et al.; "Mitigating wind erosion of sand using biopolymer-assisted EICP technique", Soils and Foundations, Feb. 23, 2020 (16 pages).

Chandra, A. and Ravi, K.; "Application of Enzyme Induced Carbonate Precipitation (EICP) to improve the shear strength of different type of soils", Problematic Soils and Geoenviromental Concerns, vol. 88, Dec. 2018 (8 pages).

Javadi et al.; "EICP Treatment of Soil by Using Urease Enzyme Extracted from Watermelon Seeds", Geotechnical Special Publication, Mar. 2018, pp. 115-124 (10 pages).

Rohy et al.; "One Phase Soil Bio-Cementation with EICP-Soil Mixing", The 4th World Congress on Civil, Structural, and Enviromental Engineering, Apr. 2019 (8 pages).

* cited by examiner

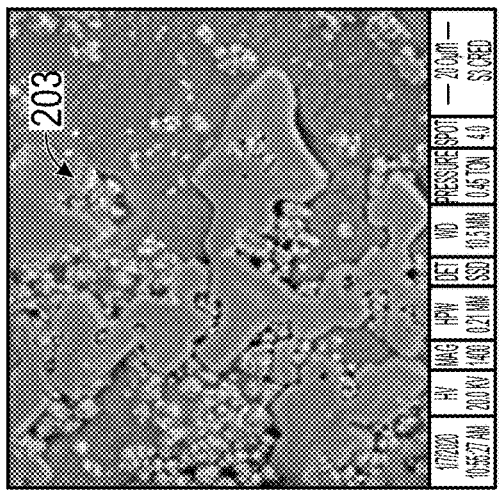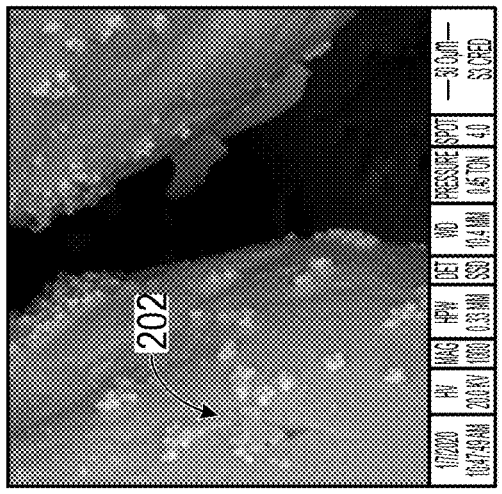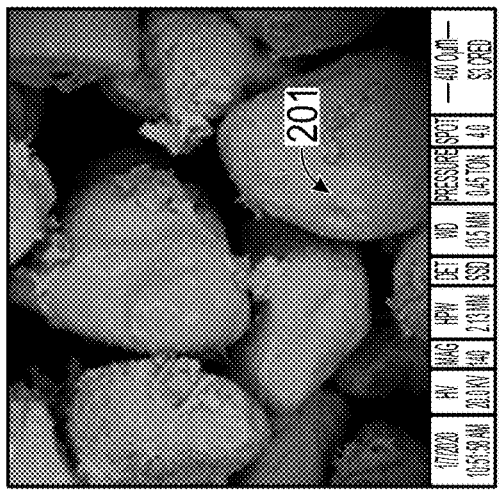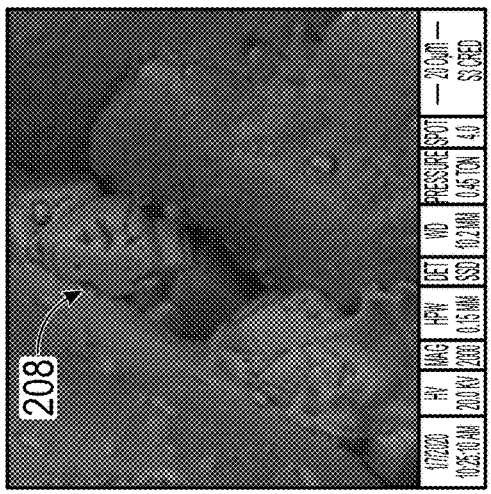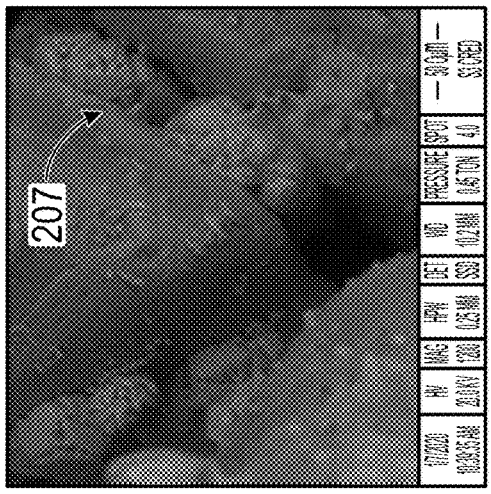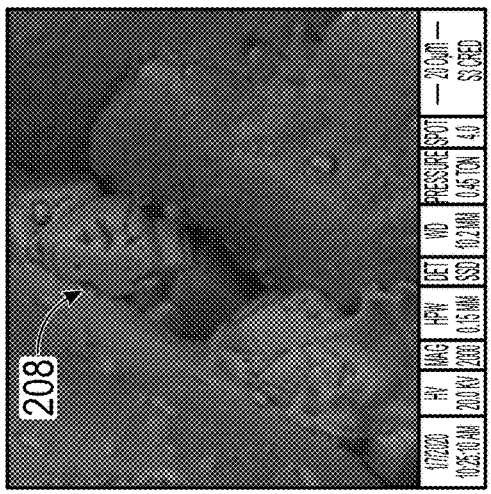

SAND CONSOLIDATION BY ENZYME MEDIATED CALCIUM CARBONATE PRECIPITATION

BACKGROUND

Sand production from poorly consolidated formations, including reservoirs, has been a persistent problem in the petroleum industry. In particular, production of sand from wells may cause a number of problems, such as slowing hydrocarbon production rate, scaling downhole equipment, including pipelines and valves, and damaging surface facilities. Furthermore, the repair or replacement of such equipment may only be performed during production shutdowns, where it is generally undesirable to slow down producing assets.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, embodiments disclosed are directed to methods for treating a formation. The methods may include introducing components of a treatment solution into a wellbore such that the treatment solution contacts the formation to be treated. The treatment solution may include urea, urease, a calcium ion source, one or more polysaccharides, a casein protein, a protease, an ionic compound, and a sugar. In the methods, the formation may have an amount of sand production before treatment and may be in fluid contact with the wellbore. Further, in these methods, an amount of sand production after treatment may be less than the amount of sand production before treatment.

In another aspect, embodiments disclosed are directed to treatment solutions including a mixture of urea, urease, a calcium ion source, one or more polysaccharides, a casein protein, a protease, an ionic compound, and a sugar in an aqueous solution.

In another aspect, embodiments disclosed are directed to a consolidated sand structure composition. The composition may include previously unconsolidated sand interlinked by inter-particle cementitious bonds comprising deposited calcium carbonate crystals. The consolidated sand has a structural strength and the consolidated sand structure is porous to permit fluid flow through the composition.

Other aspects and advantages of this disclosure will be apparent from the following description made with reference to the accompanying drawings and the appended claims.

BRIEF DESCRIPTION OF DRAWINGS

FIGS. 2A-2C are Scanning Electron Microscopy (SEM) images at different levels of magnification of sand particles treated with an EICP (Enzyme Induced Carbonate Precipitation) solution without additives. FIGS. 2D-2F are SEM images at different levels of magnification of sand particles treated with an EICP solution comprising a combination of additives. The levels of magnification are from 100× to 2000× (140× in FIG. 2A, 1000× in FIG. 2B, 1400× in FIG. 2C, 100× in FIG. 2D, 1200× in FIG. 2E, and 2000× in FIG. 2F).

DETAILED DESCRIPTION

Figure 1:
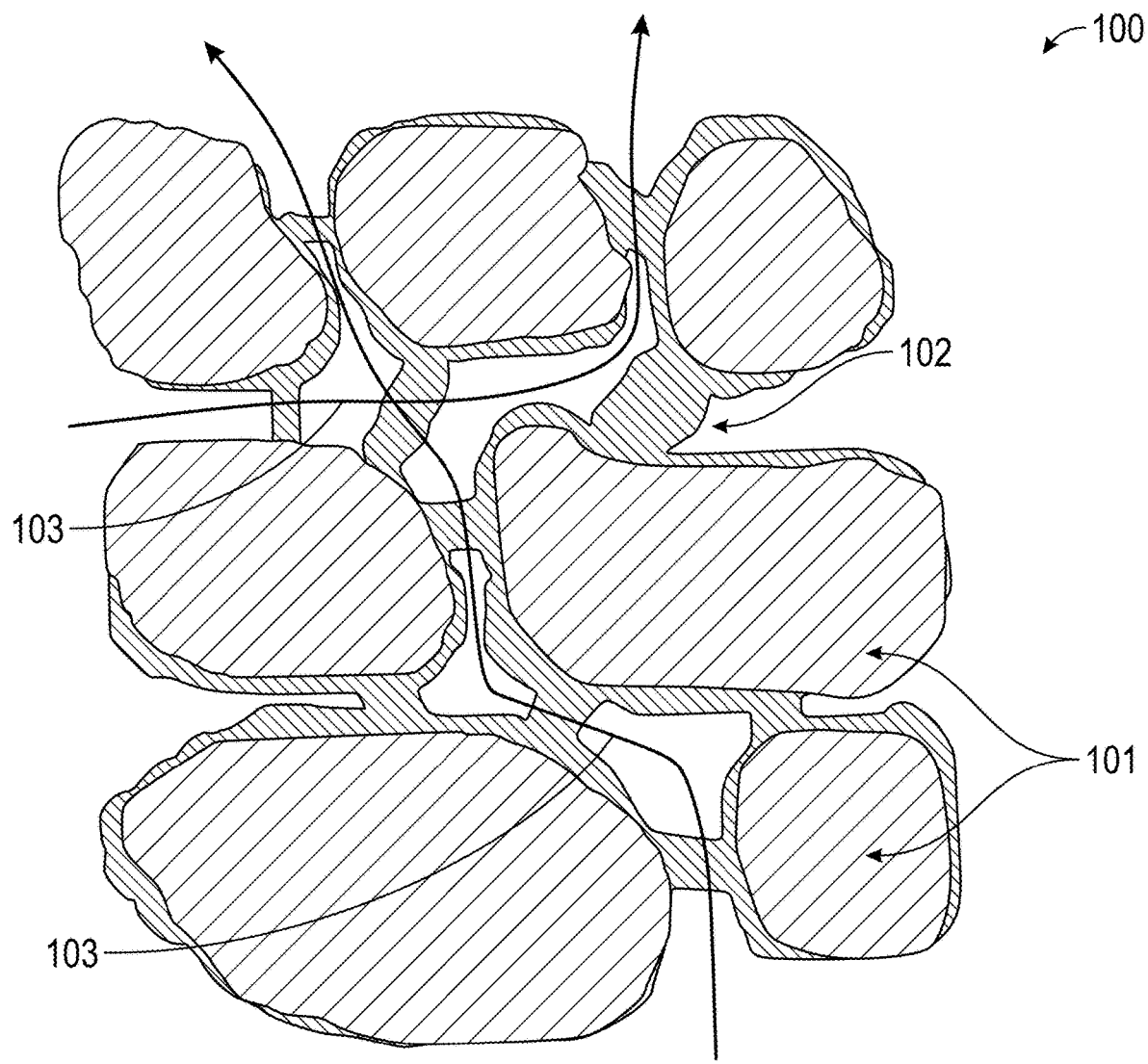
FIG. 1 is a representation of an arrangement of sand grains in a formation showing the cementation of the sand grains with urease-induced calcium carbonate precipitate.

Several technologies have been used to reduce sand production, including gravel packing and perforation methods. However, these techniques require the use of heavy tools that add to the cost of a new well and ongoing production. In addition, these techniques employ mechanical technologies that unduly interfere with the workover and completion processes, which are continuously applied during the production life of a wellbore.

Enzyme Induced Carbonate Precipitation (EICP) is a method of carbonate precipitation via hydrolysis of urea employing urease enzyme. Carbonate precipitation via hydrolysis of urea is a technique that has been investigated to control sand production. This technique utilizes the urease enzyme to catalyze the hydrolysis of urea (ureolysis) in an aqueous solution, causing in the presence of calcium ions, the formation of carbonate ions leads to calcium carbonate precipitation.

EICP is an in situ chemical reaction that may be a useful part of a method for effecting sand consolidation. EICP employs a urease enzyme to catalyze the hydrolysis of urea in an aqueous solution. EICP in the presence of divalent ions generates ammonium ions and a carbonate mineral that precipitates out of the aqueous solution. For example, in the presence of calcium chloride ($CaCl_2$)), EICP results in calcium carbonate ($CaCO_3$) precipitate as shown in Equation 1:

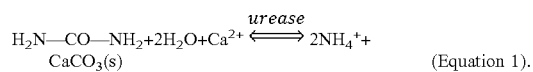

$$H_2N-CO-NH_2 + 2H_2O + Ca^{2+} \xrightleftharpoons{urease} 2NH_4^+ + CaCO_3(s)$$ (Equation 1).

Mineral precipitation may include one or more cations that may produce one or several phases of carbonate minerals, including calcite.

However, it has been found that mere carbonate precipitation using EICP is not sufficient to form cementation via inter-particle bonding. The calcium carbonate precipitates as a fine powder that does not adhere to itself. Because it does not adhere to itself, the fine mineral particles do not provide cementation between sand particles. Without inter-particle bonding, such properties are not achieved.

Embodiments in accordance with the present disclosure generally relate to methods for reducing sand production from formations using EICP in combination with additives to produce consolidated sand particles. In one or more embodiments, mineral precipitate may form cementation bridges and fill voids between sand particles. Use of an EICP solution with a combination of additives has been found to result in calcium carbonate adhering to itself, thus providing cementation between sand particles.

The application of the EICP technique using an EICP solution comprising a combination of additives to consolidate sand particles and therefore reduce sand production is more effective than mechanical sand control technologies previously described. More particularly, the addition of a composition of chemical compounds in an EIPC system has been found to result in an environmentally-friendly and reversible sand control system. In particular, the reversibility of such an EIPC system alleviates the issue of potential plugging of reservoirs when using solutions based on resin mediated sand consolidation chemicals. If the permeability is impacted by the enzymatic based solution during the chemical placement process, acid may be injected and some of the lost permeability may be retained, because $CaCO_3$ is an acid soluble material.

The use of such a chemical composition in an EIPC system has also been found to consolidate sand particles and reduce sand production in formations under typical hydrocarbon production conditions. This technique is also more flexible in that it can be introduced into a wellbore that has equipment in place. Mechanical techniques, as previously described, require significant downtime, loss of production efficiency, and may cause safety and wellbore control issues from removing and replacing downhole equipment.

One or more embodiments of the present disclosure relate to an EICP technique that relies on the hydrolysis of urea by the enzyme urease in an aqueous solution, forming carbonic acid and ammonia. In the presence of calcium ions in the solution, the carbonate ions precipitate as calcium carbonate. The precipitating calcium carbonate from the aqueous solution acts as the cementing agent. The cementing agent may aid in preventing sand production at high temperature (for example, at least 70° C.) in a formation. For the purposes of this disclosure, the term "high temperature" is referring to formation temperatures at or greater than about 70° C., such as in the range of 70° C. to 100° C. The addition of chemical additives to the aqueous solution comprising the EICP system improves the strength of the sand consolidation form. Chemical additives may include, but are not limited to, polysaccharides, such as naturally-derived gums, including guar gum and xanthan gum; proteins, for example, casein protein; sugars or sucrose derivatives, for example sucralose; an ionic compounds, such as sodium chloride; and an additional enzyme, such as protease. It has also been discovered that the functionality of the enzyme reaction may occur at reaction temperatures conditions of about 70° C., for example, temperatures in the range of 70° C. to 100° C.

One or more embodiments of the present disclosure relate to a method to reduce sand production from unconsolidated or poorly-consolidated high temperature formations. In particular, the method includes introducing an aqueous treatment solution including urea, urease, a calcium ion source, a polysaccharide, a casein protein, a sugar, an ionic compounds, and a protease. The method leads to a chemical reaction that can be carried out at temperatures greater than about 70° C., such as in the range of 70° C. to 100° C. The present method is a robust chemical technology that can be used for plugging fractures, consolidating sand, such as from sandstone formations, and minimizing proppant flow back in hydraulic fracturing.

FIG. 1 is a representation of an arrangement of sand grains in a formation showing the cementation of the sand grains with urease-induced calcium carbonate precipitate. FIG. 1 illustrates an arrangement 100 of sand grains 101 in a formation showing the cementation of the sand grains 101 with urease-induced calcium carbonate precipitate 102. As illustrated in FIG. 1, the urease-induced calcium carbonate precipitate 102 may act as a cementing agent for the sand grains 101, which are cemented through bridges of calcium carbonate crystallites. These bridges form a consolidated but still porous structure, where the flow of fluids (arrow 103) may pass through the 3D lattice structure. Such a consolidated yet porous structure of calcium carbonate crystallites results from the use of an EICP solution comprising a combination of additives according to one or more embodiments of the present disclosure.

The addition of several chemicals (for example, guar gum, xanthan gum, casein protein, sodium chloride, sugar, and protease) to an aqueous EICP solution comprising urea, urease, and a calcium ion source, may improve the strength of sand consolidation. The increase in sand consolidation strength even at high temperatures by adding the chemical composition to the EICP solution may result from enzyme stabilization. Furthermore, proteins and guar gum may precipitate and act as chelating agents, reducing the precipitation rate and favoring the formation of large calcite crystals. Additionally, such a chemical composition may precipitate and provide nucleation sites that favor calcite crystal formation. Accordingly, the method of contacting a formation with an aqueous solution, including, but not limited to, urea, urease, a calcium ion source, a polysaccharide, such as xanthan gum or guar gum, a casein protein, an ionic compound, such as sodium chloride, a sugar, and a protease, may provide for sand control.

One or more embodiments of the present disclosure relate to methods for reducing sand production from formations. The methods may include treating the formations with an aqueous treatment solutions comprising urea, urease, a calcium ion source, a polysaccharide, casein protein, an ionic compound, such as sodium chloride, a sugar, and a protease.

One or more embodiments of the present disclosure relate to methods of preventing sand production in formations. The methods may include treating the formations with an aqueous solutions comprising urea, urease, calcium ion source, a polysaccharide, casein protein, an ionic compound, such as sodium chloride, a sugar, and a protease.

In one or more embodiments, the methods for reducing sand production and for consolidating sand particles in high temperature formations may include the cementation of sand particles, including silt particles, sediments, soil particles, rock particles, sandstone particles, shale particles, limestone particles, gypsum particles, dolostone particles, and clay particles.

In one or more embodiments, the methods for treating formations, such as by reducing sand production and for producing consolidated sand particles, may comprise introducing into a wellbore an aqueous treatment solution comprising urea, urease, a calcium ion source, one or more polysaccharides, a casein protein, a protease, an ionic compound, and a sugar. The formations may comprise a plurality of sand particles such that the formations, being in fluid contact with the wellbore, have an amount of sand production before treatment. The treatment solution may contact the formations to be treated so that the amount of sand production after treatment is less than the amount of sand production before treatment.

In one or more embodiments, the treatment solution used in the methods for reducing sand production and for producing consolidated sand particles in formations is an aqueous solution. The precipitation process takes advantage of the supply of carbonate ions derived from urea hydrolysis and of an increase in pH generated by the reaction (formation of ammonia). The production of hydroxide ions from ammonia reaction in water brings about an increase in pH, which in turn leads to the formation of carbonate ions.

The aqueous solution is a homogenous mixture of different additives. In one or more embodiments, the an aqueous solution including urea. Urea is an organic compound of the chemical formula $CO(NH_2)_2$. Urea is a colorless, odorless, water soluble substance with low toxicity ($LD_{50}$=12 g/kg (grams of substance per kilogram of body weight) for mouse, Agrium Material Safety Data Sheet (MSDS)). Any suitable source of urea may be used. In one or more embodiments, the urea may be present in the solution at concentrations in a range of from about 0.5 M (moles per liter of aqueous solution) to about 1.5 M urea, such as from about 0.6 M to about 1.4 M, or from about 0.7 M to about 1.3 M, or from about 0.8 M to about 1.2 M.

In one or more embodiments, the aqueous solution may include the enzyme urease. The urease of the solution used in the methods for reducing sand production and for producing consolidated sand particles may be synthetically produced or obtained by extraction from any suitable source, including but not limited to, bacteria, plants, invertebrates, and fungi. In one or more embodiments, a plant derived urease extract may be used. In one or more embodiments, the solution may include urease at concentrations in a range of from about 1 g/L (gram per liter of aqueous solution) to about 4 g/L, or from about 1.5 g/L to about 3.5 g/L, or from about 2 g/L to about 3 g/L.

In one or more embodiments, the calcium ion source of the aqueous solution may comprise calcium chloride, calcium nitrate, calcium nitrite, calcium sulfate, calcium acetate, calcium oxalate, and mixtures thereof. In addition, the calcium ion source may comprise any hydrate or solvate form of the calcium ion. For example, the calcium ion source may comprise calcium chloride dihydrate. In one or more embodiments, the calcium ion source may be present in the aqueous solution at concentrations in a range of from about 0.50 M to about 1.0 M, such as from about 0.55 M to about 0.95 M, or from about 0.60 M to about 0.90 M, or from about 0.65 M to about 0.85 M. Other calcium ion sources, such as calcium nitrate, may be converted into calcium carbonate. Calcium chloride is a useful source of calcium ions.

In one or more embodiments, the polysaccharide of the aqueous solution may comprise xanthan gum. In one or more embodiments, the polysaccharide may comprise a galactomannan polysaccharide, such as guar gum, at concentrations in a range of from about 0.50 M to about 1.0 M.

In one or more embodiments, the casein protein of the aqueous solution may comprise a micellar casein protein. The solution may include casein protein at concentrations in a range of from about 2 g/L (gram per liter of aqueous solution) to about 4 g/L.

In one or more embodiments, the aqueous solution may include one or more ionic compounds, such as sodium chloride. The solution may also include a sugar and sugar derivatives, such as sucrose derivatives, such as sucralose. Furthermore, the solution may also include a protease, for example, a protease that may be obtained from *Aspergillus niger* or *Aspergillus oryzae*. Aminogen is a protein digesting enzyme (protease) that catalyzes the breakdown of proteins into smaller polypeptides or amino acids by breaking the peptide bonds between the amino acids.

One or more embodiments may include methods for treating a formation. For example, the methods may reduce sand production from the formation. The methods may include introducing a treatment solution into a wellbore such that the treatment solution contacts the formation to be treated, where the treatment solution includes urea, urease, a calcium ion source, a polysaccharide, and casein protein. The solution of urea, urease, a calcium ion source, one or more polysaccharides, a casein protein, a protease, an ionic compound, and a sugar. The formation has an amount of sand production before treatment and is in fluid contact with the wellbore and an amount of sand production after treatment is less than the amount of sand production before treatment.

In one or more embodiments, the treatment solution used in the methods for treating a formation by reducing sand production from the formation may be prepared by mixing a first solution with a second solution prior to introducing the aqueous solution into the wellbore such that it contacts the formation to be treated. In some other embodiments, the components may be introduced separately as a first solution and a second solution or in various combinations and may be mixed in situ using coiled tubing, for example. The first solution may comprise urea, a calcium ion source, one or more polysaccharides, casein protein, a protease, an ionic compound, and a sugar. The second solution may comprise urease. In one or more embodiments, the first and second solutions may be mixed together and introduced into the wellbore to form the treatment solution in the wellbore. The mixture may contact the sand particles in the formation shortly after the mixing, wherein precipitation of calcium carbonate takes place. The addition of a chemical composition comprising casein, one or more polysaccharide(s), sodium chloride, sucralose, and protease, is believed to decrease the reaction rate and slows down the precipitation of calcium carbonate as compared with a solution without the chemical composition. Although not wanting to be bound by theory, this is believed to allow the EICP treatment solution to reach the formation before the calcium carbonate precipitation sets inside the formation. The addition of the chemical combination to the EICP solution facilitates the formation of larger calcium carbonate crystals as compared to the EICP solution alone without the additional chemical combination from which small calcite crystals form. The large calcite crystal formation is believed to occur due to the slower rate of calcite precipitation from the embodiment aqueous solution than mere EICP solutions.

According to one or more embodiments, the treatment solution may be introduced at a temperature that is less than the temperature of the formation. The methods for treating a formation may further include maintaining the wellbore such that the treatment solution achieves a temperature in a range of from about 70° C. to 100° C. In the methods for treating a formation, the treatment solution may be introduced at a temperature less than the formation temperature, such as at temperatures less than 100° C., or less than 70° C., allowing the calcite precipitation to take place. The methods may further comprise maintaining the treatment solution in the formation such that the solution temperature rises to a temperature in a range of from about 70° C. to 100° C.

According to one or more embodiments, the methods for treating a formation may further include providing the components of the treatment solution, such that providing these components may include providing a first solution and a second solution, where the first solution comprises the urea, the calcium ion source, the one or more polysaccharides, the casein protein, the protease, the ionic compound, and the sugar, and where the second solution comprises the urease. The treatment solution may be provided in parts or it may be premixed with a thermal buffer or inhibitor.

According to one or more embodiments, in the methods for treating a formation, calcium carbonate crystals may crystallize on the surface of the sand particles of the formations. The calcium carbonate crystals may have a size in a range of from about 0.1 to about 0.5 μm (micrometer). The calcium carbonate also precipitated between formations particles resulting in the formation of inter-particle contacts.

One or more embodiments may include methods of producing consolidated sand particles in formations. The method may include introducing into the wellbore an aqueous solution, the aqueous solution comprising urea, urease, a calcium ion source, a polysaccharide, and casein protein. In these methods, the temperature of the aqueous solution at the time of contacting may be at least about 70° C., for example, in a range of from about 70° C. to about 100° C. The consolidated sand particles of the formations may include calcium carbonate crystals. In one or more embodiments, the calcium carbonate crystals may have a size in a range of from about 2 to about 6 μm.

In one or more embodiments, the consolidated sand particles of the formations treated by methods according to one or more embodiments may include calcium carbonate crystals such that the consolidated material disintegrates upon applying a force, such as manual force. Sand particles treated with embodiment solution formulations, including only urea, urease and a calcium source, resulted in a slurry of wet sand that immediately yields to any application of force and does not consolidate.

In one or more embodiments, the components of the aqueous solutions may be introduced in a wellbore such that it contacts a formation. Introduction may include, but is not limited to, flushing, injecting, mixing, spraying, dripping, or trickling onto or into the formation.

In one or more embodiments, a consolidated sand structure composition includes previously unconsolidated sand interlinked by inter-particle cementitious bonds comprising deposited calcium carbonate crystals, where the consolidated sand has a structural strength, and where the consolidated sand structure is porous to permit fluid flow through the composition. In one or more embodiments, the inter-particle cementitious bonds of the consolidated sand structure composition may include deposited calcium carbonate crystals form at a temperature in a range of from about 70° C. to about 100° C. in the presence of a treatment solution. Such a treatment solution may include a mixture of urea, urease, a calcium ion source, one or more polysaccharides, a casein protein, a protease, an ionic compound, and a sugar in an aqueous solution.

EXAMPLES

The following examples are merely illustrative and should not be interpreted as limiting the scope of the present disclosure.

Example 1

EICP Formulations. EICP formulations were prepared by dissolving calcium chloride dihydrate, urea and urease enzyme and, in treatment cases, and a chemical composition, into distilled water. Two different EICP formulations were prepared for sand treatment.

EICP Formulation 1 (Comparative Solution) was prepared by dissolving calcium chloride dihydrate, urea, and urease enzyme in deionized water. EICP Formulation 1 was a solution composed of 1.0 M urea, 0.67 M calcium chloride, and 3 g/L urease enzyme.

EICP Formulation 2 (Treatment Solution) was prepared by preparing two separate solutions. A first solution was prepared by dissolving calcium chloride dihydrate, urea, and a chemical composition containing micellar casein protein, xanthan gum, guar gum, sodium chloride, sucralose, and protease AMINOGEN®, (USN; United Kingdom), in deionized water. A second solution was prepared by dissolving urease enzyme in deionized water. The two solutions were combined and mixed together to provide EICP Formulation 1. EICP Formulation 2 was composed of 1.0 M urea, 0.67 M calcium chloride, and 3 g/L urease enzyme, and 4 g/L of a chemical composition containing micellar casein protein, xanthan gum, guar gum, sodium chloride, sucralose, and protease AMINOGEN®.

Sand treatment. Sand samples were treated with either EICP Formulation 1 or EICP Formulation 2. Test specimens were prepared by mixing each sand sample with either EICP Formulation 1 or EICP Formulation 2 and by exposing each sample to different temperature conditions (70° C. to 100° C.). The increase in sand consolidation strength at these temperatures by adding the chemical combination to the EICP solution may be due to enzyme stabilization. Furthermore, proteins and guar gum may precipitate and act as chelating agents, reducing the precipitation rate and favoring the formation of large calcite crystals. Additionally, such chemical combination may precipitate and provide nucleation sites that favor large calcite crystal formation at these temperatures.

A sample of sand particles treated with Formulation 1 resulted in a wet sandy mixture that did not have consolidation between the sand particles. In contrast, the treatment of sand particles with Formulation 2 resulted in a consolidated sand mixture that disintegrated upon the application of manual force. Similar results were observed at high temperatures of 70° C. to 100° C.

Microscale Identifications. XRD (X-Ray Diffraction) analyses were performed on intact pieces of specimens from the sand samples treated with either EICP Formulation 1 or EICP Formulation 2 to identify the crystal phase of calcium carbonate. SEM imaging was carried out on these intact pieces to visualize the morphology of calcium carbonate.

FIGS. 2A-2C show the SEM images at different levels of magnification performed on intact pieces of specimens of sand particles treated with EICP Formulation 1. FIGS. 2D-2E show the SEM images at different levels of magnification performed on intact pieces of specimens of sand particles treated with EICP Formulation 2.

Figure 3A:
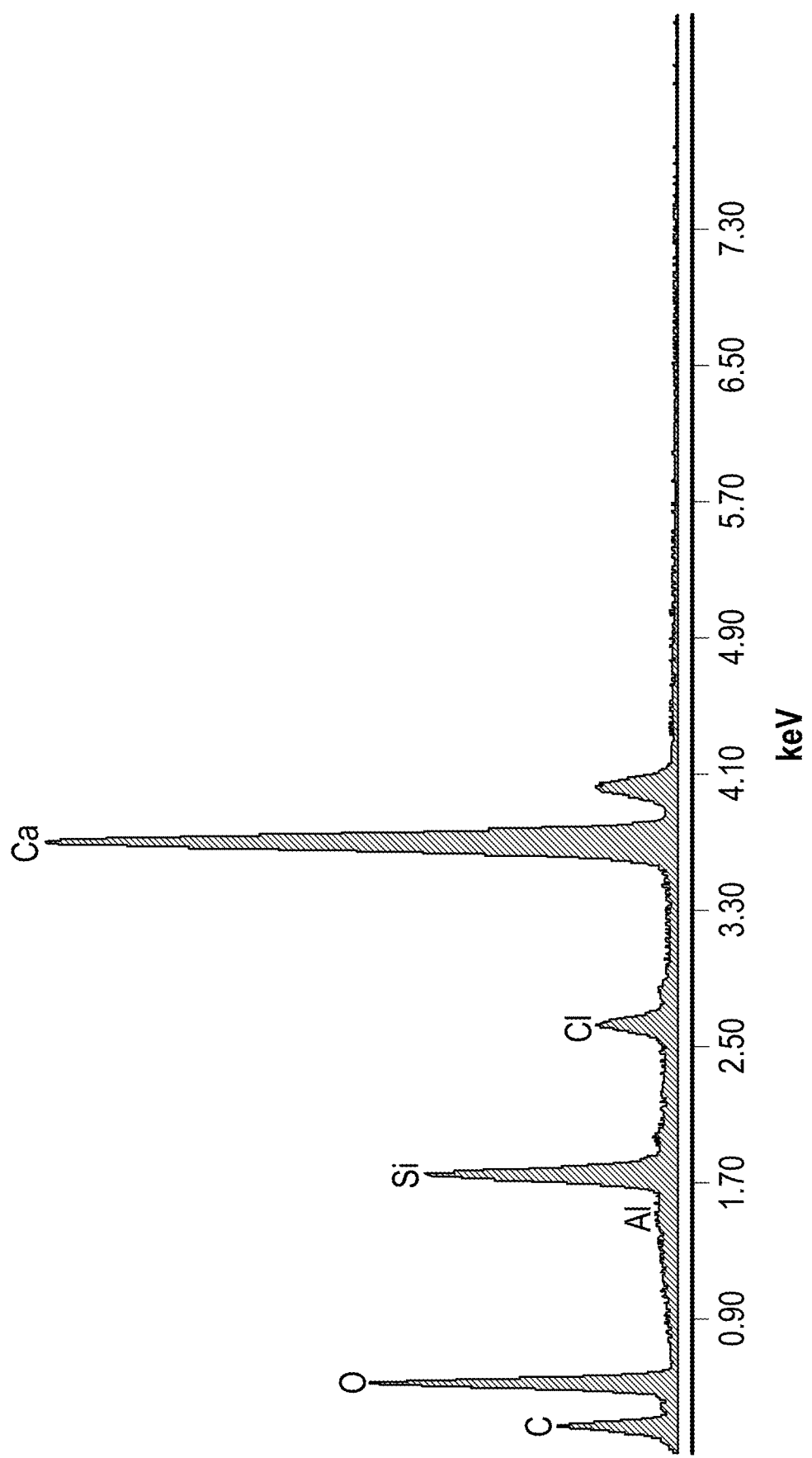
FIG. 3A is a graph showing the Energy Dispersive Spectroscopy (EDS) analysis of several regions at different levels of magnification as shown in FIGS. 2A-2C.
Figure 3B:
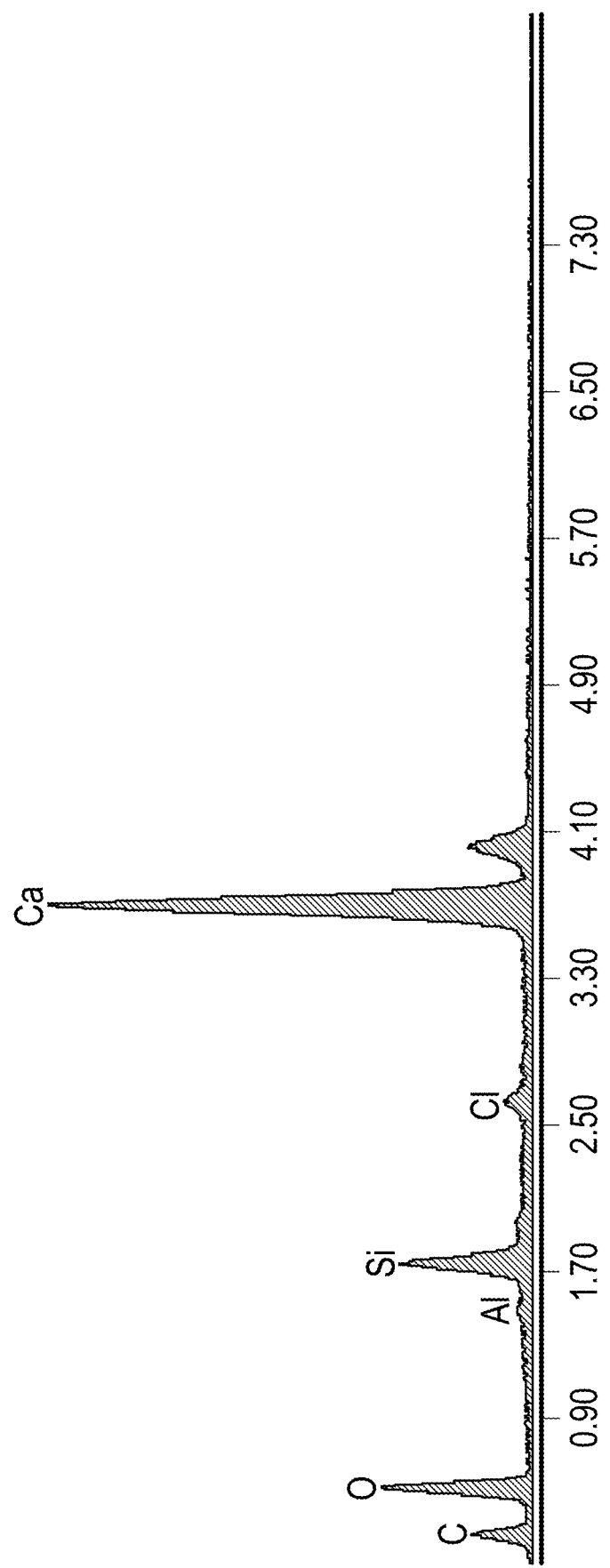
FIG. 3B is a graph showing the EDS analysis of several regions at different levels of magnification as shown in FIGS. 2D-2F.

SEM imaging showed that treatment of sand particles with the comparative example (an EICP solution without the chemical composition) formed small calcite crystals cladding the sand particle surface. These calcite crystals had sizes of about 0.5 to 1 μm. The region indicated by arrows 201, 202, and 203, on FIGS. 2A-2C, respectively, shows the surface calcite at different levels of magnification. In contrast, the embodiment chemical composition comprising micellar casein protein, xanthan gum, guar gum, sodium chloride, sucralose, and protease AMINOGEN® to the EICP solution used for the sand particle treatment resulted in the formation of an embodiment resultant with large calcite crystals having sizes of about 2 to about 6 μm. Precipitation mainly exhibited inter-particle contacts. The region indicated by arrows 206, 207, and 208, on FIGS. 2D-2F, respectively, shows the inter-particle contacts. The regions indicated by arrows 204 and 205 on FIG. 2D shows broken inter-particle bonds. The large calcite crystals and inter-particle pattern of precipitation resulting from the treatment with Formulation 2 is believed to be a major contributor to the increase of strength versus the comparative specimens treated without adding the chemical composition containing protein and polysaccharides to the EICP Solution As shown in FIGS. 3a and 3b, XRD testing confirmed precipitation of calcium carbonate in the calcite phase in of specimens of sand particles treated with EICP Formulations 1 and 2. While the micellar casein protein, xanthan gum, guar gum, sodium chloride, sucralose, and protease increased the cementation strength of sand particles through increased inter-particle contacts, they did not change the crystalline structure of the calcium carbonate on and between the sand particles.

Accordingly, the addition of chemical additives (for example, guar gum, xanthan gum, and casein protein) increased sand consolidation strength and expanded the application of methods using EICP solutions including such chemical additives to the treatment of formations at high temperature conditions.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A method for treating a formation, comprising:
    introducing components of a treatment solution into a wellbore such that the treatment solution contacts the formation to be treated, where the treatment solution comprises:
        urea;
        urease;
        a calcium ion source;
        one or more polysaccharides;
        a casein protein;
        a protease;
        an ionic compound; and
        a sugar; and
    maintaining the treatment solution in the formation such that the solution temperature rises to a temperature in a range of from about 70° C. to about 100° C.,
    where the formation has an amount of sand production before treatment and is in fluid contact with the wellbore, and
    where an amount of sand production after treatment is less than the amount of sand production before treatment.

2. The method of claim 1, where the components of the treatment solution are introduced separately as a first solution and a second solution such that the treatment solution forms in the wellbore, where the first solution comprises the urea, the calcium ion source, the one or more polysaccharides, the casein protein, the protease, the ionic compound, and the sugar, and where the second solution comprises the urease.

3. The method of claim 2, where the first solution is introduced using coiled tubing.

4. The method of claim 1, where the components of the treatment solution are introduced into the wellbore combined as the treatment solution.

5. The method of claim 1, where the components of the treatment solution are introduced at a temperature that is less than the temperature of the formation.

6. The method of claim 1, where the one or more polysaccharides are selected from the group consisting of xanthan gum, guar gum, and combinations thereof.

7. The method of claim 1, where the calcium ion source comprises calcium chloride dihydrate.

8. The method of claim 1, where the casein protein comprises a micellar casein protein.

9. The method of claim 1, where the ionic compound comprises sodium chloride.

10. The method of claim 1, where the sugar comprises sucralose.

11. The method of claim 1, further comprising providing the components of the treatment solution.

12. The method of claim 11, where providing the components of the treatment solution comprises providing a first solution and a second solution, where the first solution comprises the urea, the calcium ion source, the one or more polysaccharides, the casein protein, the protease, the ionic compound, and the sugar, and where the second solution comprises the urease.

* * * * *